United States Patent [19]

Ohno

[11] 4,417,906
[45] Nov. 29, 1983

[54] PROCESS FOR PRODUCTION OF SILICON CARBIDE COMPOSITE

[75] Inventor: John M. Ohno, Plymouth, Mich.

[73] Assignee: General Electric Company, Pittsfield, Mass.

[21] Appl. No.: 312,987

[22] Filed: Oct. 20, 1981

Related U.S. Application Data

[63] Continuation of Ser. No. 167,196, Jul. 9, 1980.

[51] Int. Cl.³ .............................................. B24D 3/02
[52] U.S. Cl. ...................................... 51/307; 51/308; 264/56; 264/101; 264/345
[58] Field of Search ................... 51/307, 308; 264/56, 264/101, 345

[56] References Cited

U.S. PATENT DOCUMENTS

| | | | |
|---|---|---|---|
| 2,938,807 | 3/1960 | Andersen | 106/44 |
| 3,816,081 | 6/1974 | Hale | 29/62.7 |
| 4,018,631 | 4/1977 | Hale | 148/31.5 |
| 4,063,909 | 12/1977 | Mitchell | 51/309 R |
| 4,120,731 | 10/1978 | Hilleg e al. | 501/90 |
| 4,124,401 | 11/1978 | Lee et al. | 106/44 |
| 4,151,686 | 5/1979 | Lee et al. | 51/307 |
| 4,167,399 | 9/1979 | Lee et al. | 51/307 |
| 4,168,957 | 9/1979 | Lee et al. | 51/309 |
| 4,171,339 | 10/1979 | Lee et al. | 264/332 |
| 4,173,614 | 11/1979 | Lee et al. | 264/332 |
| 4,219,339 | 8/1980 | Wilson | 51/307 |
| 4,220,455 | 9/1980 | Pierre et al. | 51/295 |
| 4,220,677 | 9/1980 | Fedoseev et al. | 427/215 |
| 4,231,195 | 11/1980 | DeVries et al. | 51/307 |
| 4,238,433 | 12/1980 | Hilleg et al. | 264/60 |
| 4,241,135 | 12/1980 | Lee et al. | 51/308 |
| 4,242,106 | 12/1980 | Morelock | 51/307 |
| 4,247,304 | 1/1981 | Morelock | 51/295 |
| 4,268,582 | 5/1981 | Hale et al. | 428/446 |

FOREIGN PATENT DOCUMENTS

| | | |
|---|---|---|
| 10257 | 10/1979 | European Pat. Off. |
| 12966 | 12/1979 | European Pat. Off. |
| 2006733A | 5/1979 | United Kingdom |

Primary Examiner—Donald E. Czaja
Assistant Examiner—W. Thompson
Attorney, Agent, or Firm—Hedman, Casella, Gibson, Costigan & Hoare

[57] ABSTRACT

A process for producing a sintered silicon carbide composite includes the steps of forming a first dispersion of diamond crystals and carbon black in paraffin, as well as forming a second dispersion of carbon fiber, carbon black and filler in paraffin. The two dispersions are compacted together to form an integral bi-layer composite which is then subjected to a vacuum for a period of time at a temperature sufficient to vaporize essentially all of the paraffin. Silicon is heated to cause liquification and direct infiltration into both layers of the composite after which the composite is sintered under conditions sufficient to produce a $\beta$-silicon carbide binder uniting the composite.

14 Claims, 2 Drawing Figures

PROCESS FOR PRODUCTION OF SILICON CARBIDE COMPOSITE

This is a continuation of application Ser. No. 167,196 filed July 9, 1980. Cross-reference to Related Application-U.S. Ser. No. 167,019, filed July 9,1980 by John M. Ohno, and assigned to the assignee of the present invention. cl BACKGROUND OF THE INVENTION Articles composed of materials having refractory characteristics, hardness and resistance to erosion have myriad important uses. Representative materials are described in U.S. Pat. No. 2,938,807 of Andersen.

Reaction sintering of $\alpha$-silicon carbide and $\beta$-silicon carbide has been known for making high temperature components. For example, $\beta$-silicon carbide is described as an excellent binder in the Andersen U.S. Pat. No. 2,938,807, however, no diamond is incorporated in this silicon carbide technology.

Another useful component of these materials would be diamond. Its superior properties of, for example, hardness have long been appreciated. A satisfactory means of incorporating diamond into such articles would be of a significant advantage and such is an object of the process and product of the present invention.

A metal is used to bind diamond crystals in U.S. Pat. No. 4,063,909 to Robert D. Mitchell. Such metal may be, for example, Co, Fe, Ni, Pt, Ti, Cr, Ta and alloys containing one or more of these metals.

The above and other patents in the area of bonding diamond crystals depend on hot-press technology, as for example described in U.S. Pat. No. 4,124,401 to Lee et al, U.S. Pat. No. 4,167,399 to Lee et al, and U.S. Pat. No. 4,173,614 to Lee et al, all of which patents are assigned to the assignee of the present invention.

INTRODUCTION TO THE INVENTION

The present invention employs diamond crystal; $\alpha$-SiC, $\beta$-SiC or other filler crystals; carbon black; carbon fiber and paraffin to produce composite bodies with sintered diamond at the top as a thin, usually flat, surface layer.

The process of the present invention is more productive than the prior art of making diamond tools or wear components in that it involves:

(1) Room temperature pressing of diamond-incorporated composite to a desired shape, using high quality carbons and paraffin, without any use of other additives described in the prior art.

(2) Simple direct infiltration without use of metal or alloy substrate or wick material to guide infiltration. No pressure is applied to infiltrate, but a diffusion process is utilized.

(3) Shaping is greatly simplified because it is largely performed prior to in situ formation of binder by reaction between silicon and carbon The subject invention has a definite saving of time and material, such as diamond grinding wheel, to produce a final shape. A drastic cost saving in machining abrasive materials is realized due to its excellent performance.

The composites of the present invention are prepared by the steps of:

(a) forming a first dispersion of diamond crystals and carbon black in paraffin;
(b) forming a second dispersion of carbon fiber, carbon black and filler in paraffin;
(c) compacting said dispersions together to produce an integral bi-layer composite;
(d) subjecting said composite to a vacuum for a period of time at a temperature sufficient to vaporize essentially all of said paraffin;
(e) heating silicon to cause liquefaction and direct infiltration into both layers of said composite; and
(f) sintering the composite containing silicon under conditions sufficient to produce a $\beta$-silicon carbide binder uniting said composite.

As a result of this process, a bonded composite having a superior wear resistance surface layer is produced. That diamond crystal containing surface, held tightly by a strong silicon carbide bonding matrix, is particularly suitable as a tooling or cutting edged.

DESCRIPTION OF THE INVENTION

Figure 1:
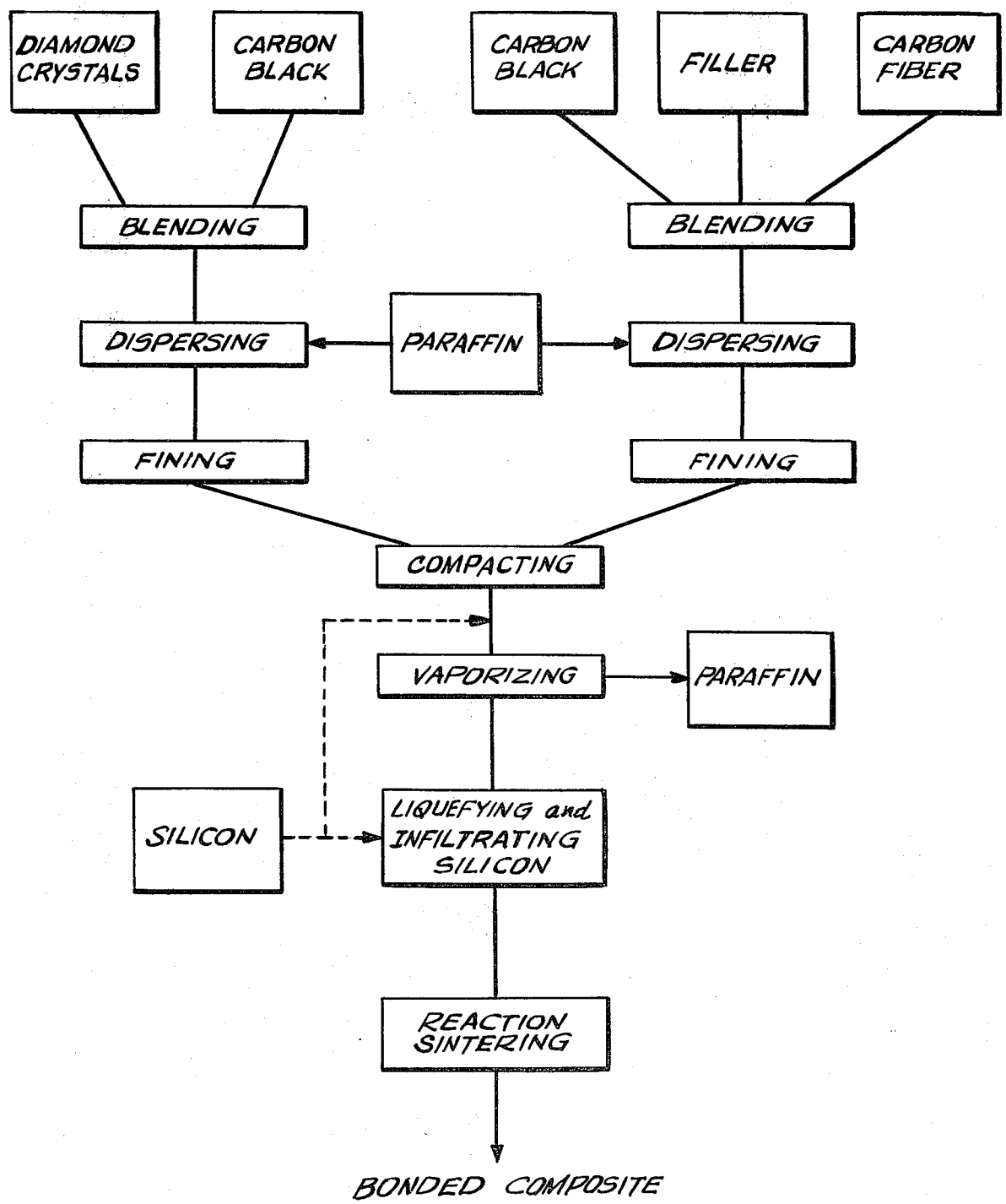
FIG. 1 is a schematic diagram of the process of the present invention.

The present process for preparing silicon carbide composites is diagrammed in representative manner in FIG. 1. As shown by that diagram, one of the initial steps involves the formation of a dispersion of diamond crystals and carbon black in paraffin.

For various reasons, small crystals are usually employed in this first dispersion. In a preferred embodiment, the diamonds employed include crystals having a size less than 400 mesh. Crystals of this preferred size will, when bonded with $\beta$-silicon carbide, exhibit superior resistance to chipping. In addition, they provide sharp edges having desirable relief angles for cutting inserts and other wear components.

To the diamond crystals must be added carbon black. This carbon serves subsequently by reacting to yield $\beta$-silicon carbide for the bonding matrix of the present composites. This carbon black is desirably of high purity to reduce the presence of contaminents. In particular, its sulfur content should be low to avoid possible side reactions during subsequent processing. Although varying amounts of carbon black are permissible, from 1% to 3%, most preferably about 2%, by weight of diamond has proven optimum.

The paraffin utilized in the first dispersion may be any of the hydrocarbon waxes encompassed by the common meaning of this term. Again a high purity paraffin should be employed to avoid possible harmful residue. For ease of admixture, a liquid paraffin is employed. This may, however, be accomplished by operating under a temperature sufficiently high to melt a paraffin which is ordinarily solid under ambient conditions. The amount of paraffin employed is not critical as it is subsequently removed. It generally constitutes from 3% to 6% by total weight of the first dispersion.

The foregoing constituents may simply be mixed together to form the first dispersion. A very intimate and homogeneous dispersion is, however, preferred. Consequently, a step-wise technique such as that outlined in the flow diagram of FIG. 1 is desirable.

In accordance with that technique, the diamond crystals and carbon black are blended to permit an even coating of the crystal surfaces. Only after this step is the paraffin mixed into the blend. Thereafter, the first dispersion is preferably subjected to a further step of fining, as by grinding.

Formation of the second dispersion may be performed in the same manner as in formation of the first dispersion. However, after fining, the second dispersion or admixture containing carbon fiber, carbon black, and paraffin may be passed through a screen of, for example, about 20 mesh to reduce any agglomeration which may have occurred.

The paraffin and carbon black utilized in forming the second dispersion may be any of these previously described. For convenience, the same ones are ordinarily utilized in forming both the first and second dispersions. A high purity carbon black is again particularly important. Generally, the second dispersion also contains from 3% to 6% paraffin and 2% to 4% carbon black by weight.

The carbon fiber employed is desirably of very small size to facilitate homogeneous admixture and, in particular, the fining operation. The sizes of fiber are preferably of from 6 to 30 microns in diameter, and 250 to 500$\mu$ in length.

The filler is provided to increase bulk and also to improve the compressibility of the powder mix containing fiber. It is highly desirable for a number of applications. Although such a filler may comprise any material which is stable under the conditions to which it is subjected during sintering and use, fine $\beta$- or $\alpha$-silicon carbide is preferred. Ordinarily, from 40 to 75% of filler by total weight of the second dispersion is employed. This range does not, of course, include the amount of $\beta$-SiC formed during the subsequent sintering step.

Once the two dispersions have been formed, they are compacted together to produce a bi-layer composite. This can be readily accomplished in a mold. A mold having the desired shape may, for example, be partially filled with one dispersion and then topped with the other. A plunger inserted into the opening of the mold may then be utilized for compaction. The amount of pressure applied is usually at least 1400 kg/cm$^2$ and desirably is from 1700 to 2300 kg/cm$^2$.

There is no criticality in these steps. The thickness of the two layers may vary in conventional manner depending upon the application of the products. However, it is preferred to employ the two dispersions in a ratio such that the first, diamond-containing layer will be from 0.25 to 0.8 mm. in thickness for cutting inserts. It is also preferred that the layer be flat.

One thing of great importance in this operation is the shape of the mold. A significant advantage of the present invention lies in the fact that the shape impressed upon the composite during molding ordinarily need not be altered. Thus the time consuming and difficult finishing to a desired shape, common with other diamond-containing materials, may be eliminated in accordance with the present process. The mold should therefore have the configuration desired for the ultimate portion of the body to which the composite corresponds. Pressure compaction, even at room temperature, will provide the composite containing paraffin with sufficient "green strength" or physical stability to retain its imparted shape during subsequent operations.

Once molded to the desired shape the composite is (as shown in FIG. 1) subjected to vacuum and temperature conditions sufficient to vaporize the paraffin from both of its layers. Suitable conditions are, of course, dependent upon the particular paraffin present. Generally, however, a pressure of less than 200$\mu$ and temperature of about 500° C. are utilized. Alternatively, another temperature and correspondingly varied vacuum may be employed.

The vaporization of the paraffin is preferably conducted slowly. This avoids, for example, violent boiling and/or build-up of gaseous pressure within the composite. Accordingly, conditions requiring at least 10 minutes and preferably from 10 to 15 minutes for the essentially complete removal of the paraffin are preferred.

The remaining essential constituent for the present process is elemental silicon. Depending upon the apparatus employed during paraffin vaporization and/or subsequent steps, silicon may be brought into direct contact with the composite at different stages of the process, as long as it is present for infiltration. This option is shown in FIG. 1 through use of dashed lines indicating convenient stages for addition. Commonly, therefore, it is introduced immediately prior to paraffin vaporization. This allows vaporization and infiltration etc. to occur without interruption and in the same heating device. Silicon may, however, be added directly after the step of paraffin vaporization.

Silicon is then heated. This causes it first to liquefy and then to infiltrate the composite. These steps occur quickly and bring the silicon into intimate contact with the original carbon black and fiber constituents of the composite.

There must be sufficient elemental silicon present to permit, under the conditions of sintering, infiltration (or diffusion into) and reaction with substantially all of the carbon black and carbon fiber of the composite. There may also be excess silicon. It is not detrimental if, after sintering, a small amount of free silicon remains within the composite. Up to about 14% excess silicon is even desirable to ensure substantially complete reaction in both layers.

The operation of bonding the composite actually involves a series of steps, all of which may occur essentially simultaneously. These steps include melting of the silicon, infiltration of molten silicon into the composite and finally reaction of the silicon with both the carbon black and carbon fiber in the layers of the composite to produce $\beta$-silicon carbide.

To induce this last reaction between silicon and carbon, a minimum temperature of at least about 1450° C. is required. Higher temperatures may also be utilized. A maximum of about 1500° C. is, however, preferred to avoid graphitization of the diamond crystals. Normally the composite should be maintained at a temperature within this range. At least 10 minutes at 1450° C. preferably about 30 minutes at 1450° to 1490° C. is preferred. This ensures substantially complete reaction of available carbon black and carbon fiber with the silicon.

These temperatures are sufficiently high to ensure the molten silicon infiltrate into the composite. Consequently, the entire operation may proceed essentially simultaneously under a single set of conditions or in a sequential stepwise progression, as desired.

Remarkably, and in contrast to most prior art techniques, the process of the present invention does not require application of pressure during silicon infiltration or sintering. This, of course, means that there is not need for a hot press mold at this stage of the present process. Such other processes as are, for example, described in U.S. Pat. No. 4,124,401 of Lee et al, rely upon a pressure upwards of 20,000 psi for this portion of the process.

Once reaction between carbon black and carbon fiber with silicon in the composite has essentially ceased, the bonded product may be cooled. If, as desired, the composite was formed in the desired shape, it is ready for use. Most commonly, therefore, it will be configured as a cutting tool, wire drawing die, or other conventional article for which is properties are particularly desirable.

These bonded composites generally contain strata reflecting their process of production. In the main, the strata are evidenced by the filler of the second dispersion (or layer) and by the diamond crystals of the surface layer. Uniting these different strata is the bonding matrix of β-silicon carbide and, generally, some excess silicon. Thus, for example, if the filler of the second dispersion is α-silicon carbide, as preferred, that layer may consist essentially of α-silicon and β-silicon carbide with possible excess silicon. If the filler employed is β-silicon carbide, the main body will be essentially homogenous unless excess silicon is present.

The surface layer derived from the first dispersion ordinarily consists predominantly of diamond crystals and a small amount of β-silicon carbide. Most characteristic of this layer, is the presence of its diamond crystals, preferably in the range of from about 75% to 90% by weight.

A residue of unreacted constituents—generally from about 5% to 14% silicon and up to about 0.2% carbon by weight—may also exist in the second layer. The silicon residue may be present in both of the composite layers. However, residual carbon in the top layer is desirably less than 0.05% by weight.

The process and products of this invention will be more fully described in, and better understood from, the following.

EXAMPLE

Bonded composites were prepared as follows:

Firstly, diamond crystals having a mesh size of less then 4000 mesh were homogeneously blended with carbon black; paraffin was mixed into the blend according to Table 1 set forth below and then the resultant admixture was finely ground.

TABLE 1

| MIX FOR TOP LAYER (% by weight) | | | | | |
|---|---|---|---|---|---|
| Diamond of less than 400 mesh | 98% | } Mix | 95% | } (1) Top layer mix | |
| Carbon Black | 2% | | | | |
| Paraffin | | | 5% | | |

Secondly, powder mixture as set forth in Table 2 were blended together before being finely ground and sieved through a 20 mesh screen.

TABLE 2

| MAIN BODY MIX (% by weight) | | | | | | |
|---|---|---|---|---|---|---|
| α or β SiC | 97% | } Mix | 95% | } (2) | } Mix Sieved through 20 mesh screen | |
| Carbon Black | 3% | | | | | |
| Paraffin | | | 5% | | | |
| Carbon Fiber | 97% | } Mix | 95% | } (3) | | |
| Carbon Black | 3% | | | | | |
| Paraffin | | | 5% | | | |

The non-diamond containing admixture was employed to substantially fill the depression of a mold. On top of that admixture was placed a thin layer of the first, diamond-containing admixture. Then the mold contents were compacted under a conventional pressure to produce an integral bi-layer composite.

The composite was removed from the press mold and placed in contact with a small amount of elemental silicon inside a vacuum oven, as set forth in Table 3.

TABLE 3

| | (Unit: gram) | | |
|---|---|---|---|
| Mix | Example A* | Example B* | |
| (1) | 0.27 | 0.24 | Top Layer |
| (2) | 0.23 } | 0.20 } Mix | Main Body |
| (3) | 0.08 | 0.069 | |
| Si | 0.345 | 0.30 | |

*Weight depends on shape, size, total thickness, layer thickness, and relief angle of an insert and also on grade.

The oven was brought to a temperature of 500° C. and pressure of less than 200μ for 10 minutes to vaporize its content of paraffin. The temperature of the oven was then raised to 1480° C. to cause the silicon to liquefy and completely infiltrate the composite. This temperature was maintained for 30 minutes to further allow essentially complete reaction of the silicon with the carbon black and fiber within the composite. Thereafter the oven was cooled to room temperature to allow removal of the bonded composite.

The sample composites of this were each in the form (identical to that of the mold depression) of a ½ inch square, positive insert having a 1/32 inch nose radius and a 5° relief. Two of these samples (denominated test samples A and A[1]) were comparatively tested against similarly shaped tungsten carbide inserts, and commercial polycrystalline diamond inserts. The tests involved turning a 390 aluminum alloy using a depth of cut of 0.010 inches and a feed rate of 0.002 in/revolution without using coolant unitl the insert showed a wear of 0.015 inch (i.e., the end of its effective tool life).

Figure 2:
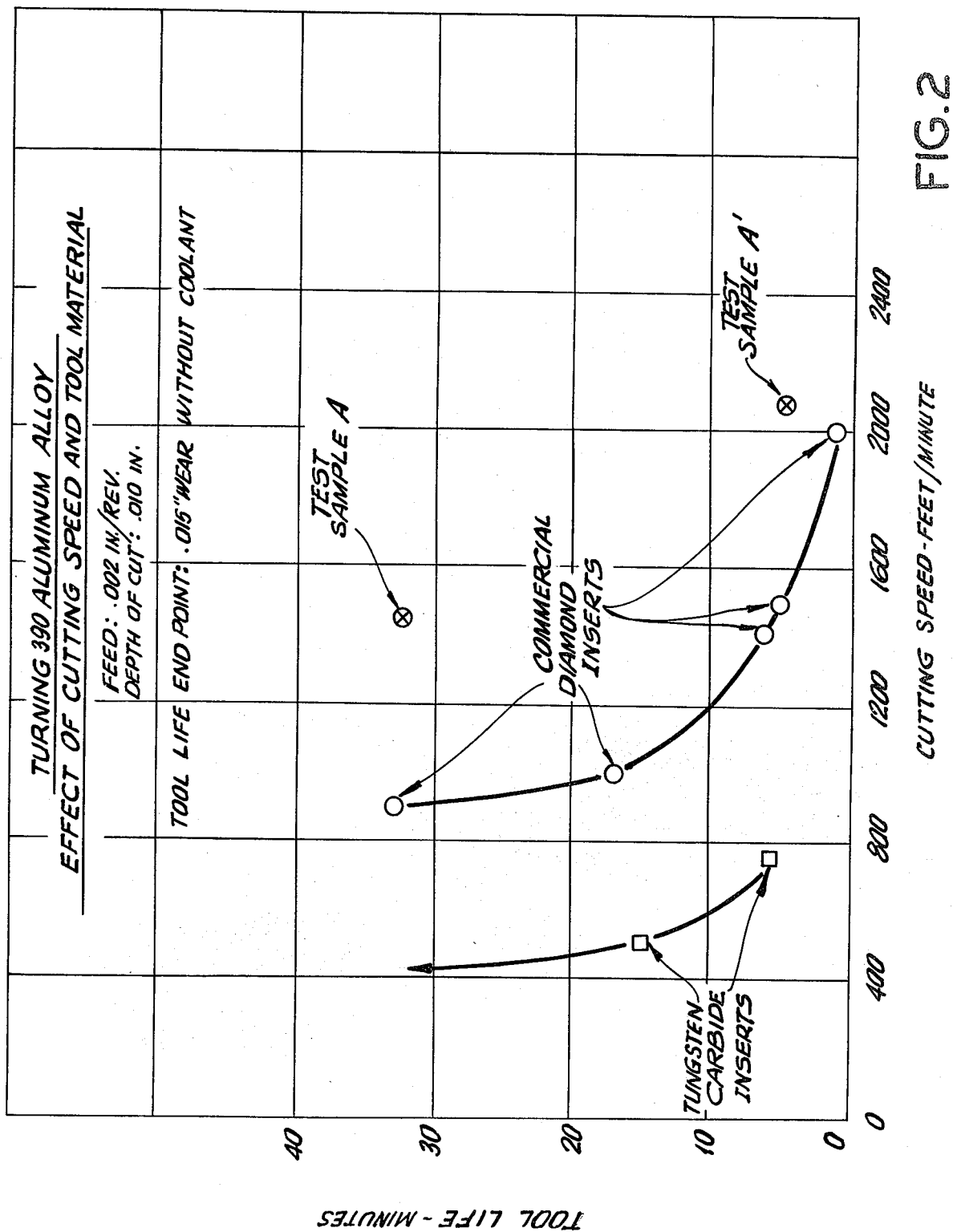
FIG. 2 depicts the results of comparative testing of sample insert composites of the present invention.

The results of the tests are depicted in FIG. 2 as a function of cutting speed. As shown by FIG. 2, the samples (A and A[1] of the present invention permit significantly higher speeds of use for a given tool life time and significantly lengthened life times for a given speed of use. This indicated they also possess superior physical hardness and/or stability.

It is to be understood that changes may be made in the particular embodiment of the invention in light of the above teachings, but that these will be within the full scope of the invention as defined by the appended claims.

I claim:
1. A process for preparing a bonded composite comprising:
(a) blending diamond crystals and carbon black to permit an even coating of said diamond crystal surfaces;
(b) forming a first dispersion of said blended diamond crystals and carbon black in paraffin;
(c) forming a second dispersion of carbon fiber, carbon black and filler in paraffin;
(d) compacting said dispersions together to produce an integral bilayer composite;
(e) subjecting said composite to a vacuum for a period of time at a temperature sufficient to vaporize essentially all of said paraffin;
(f) placing said composite in direct contact with elemental silicon;
(g) heating said silicon to cause liquification and infiltration into both layers of said composite; and

(h) sintering the composite and infiltrated silicon under conditions sufficient to produce a β-silicon carbide binder uniting said composite.

2. The process of claim 1, wherein the carbon black of the first dispersion comprises between 1% and 3% by weight of the diamond crystals.

3. The process of claim 2, wherein the first dispersion is formed by mixing the carbon black and the diamond crystals and then incorporating from 3 to 6% of paraffin by total weight.

4. The process of claim 3, wherein the second dispersion comprises from 3 to 6% of paraffin by total weight.

5. The process of claim 3, wherein the filler comprises from 40 to 75% β-silicon carbide by weight of the second dispersion.

6. The process of claim 3, wherein the filler comprises from 40 to 75% α-silicon carbide by weight of the second dispersion.

7. The process of claim 5, wherein sintering is performed in a vacuum at a temperature below about 1500° C.

8. The process of claim 7, wherein the sintered composite contains between about 5 to 14% free silicon by total weight.

9. The process of claim 8, wherein the diamond crystals are of a size less than 400 mesh.

10. The process of claim 6, wherein sintering is performed in a vacuum at a temperature below about 1500° C.

11. The process of claim 10 wherein the body contains between about 5 to 14% free silicon by total weight.

12. The process of claim 11 wherein the diamond crystals are of a size less than 400 mesh.

13. A process for preparing a bonded composite comprising:
    (a) blending diamond crystals and carbon black to permit an even coating of said diamond crystal surfaces;
    (b) forming a first dispersion of said blended diamond crystals and carbon black in paraffin; p1 (c) forming a second dispersion of carbon fiber, carbon black and filler in paraffin;
    (d) compacting said dispersions together to produce an integral bi-layer composite;
    (e) placing said composite in direct contact with elemental silicon;
    (f) subjecting said composite to a vacuum for a period of time at a temperature sufficient to vaporize essentially all of said paraffin;
    (g) heating said silicon in contact with said composite to cause said silicon to liquefy and infiltrate both layers of said composite; and
    (h) sintering the composite and infiltrated silicon under conditions sufficient to produce a β-silicon carbide uniting said composite.

14. The process of claim 13, wherein the silicon and composite are maintained in a vacuum oven to vaporize the paraffin, liquefy the silicon, infiltrate the composite and sinter the composite and infiltrate silicon.

* * * * *